(No Model.)

E. W. COOKE.
ROLLER BEARING.

No. 442,358. Patented Dec. 9, 1890.

Witnesses:

Inventor:
Ernest W. Cooke
by
Attorney.

UNITED STATES PATENT OFFICE.

ERNEST WM. COOKE, OF CHICAGO, ILLINOIS, ASSIGNOR TO THE AMERICAN ROLLER BEARING COMPANY, OF SAME PLACE.

ROLLER-BEARING.

SPECIFICATION forming part of Letters Patent No. 442,358, dated December 9, 1890.

Application filed March 6, 1890. Serial No. 342,931. (No model.)

*To all whom it may concern:*

Be it known that I, ERNEST WILLIAM COOKE, a citizen of the United States, residing in Chicago, in the county of Cook and State of Illinois, have invented a new and useful Improvement in Roller-Bearings, of which the following is a specification.

My invention relates to a roller-bearing having metallic rings held together by stay-pins, said metallic rings having a series of pits on the inner side, holding balls which act as pivots, upon which revolve a series of rollers having conical pits in each end. One of said rings has metallic plugs with concave pits in the end of each plug for the said balls to rest in. At the other end of said plug is a washer to adjust said plug in the recess of the ring. A hole is made in the ring back of each plug for the purpose of driving said plugs out, so as to allow of the rollers adjusting themselves to the shaft or axle and taking up all of the horizontal lost motion of the rollers. I attain this object by means of the mechanism illustrated in the accompanying drawings, in which—

Figure 1:
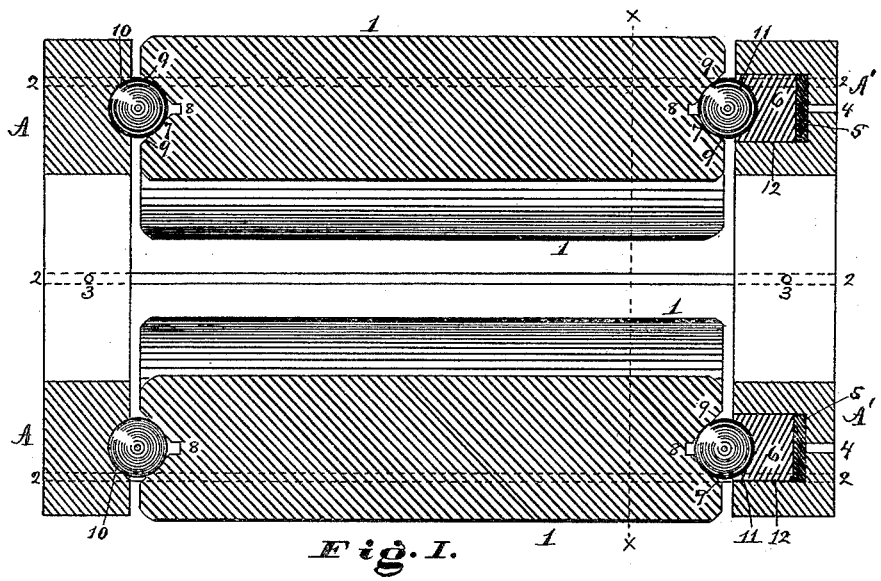
Figures 2, 3:
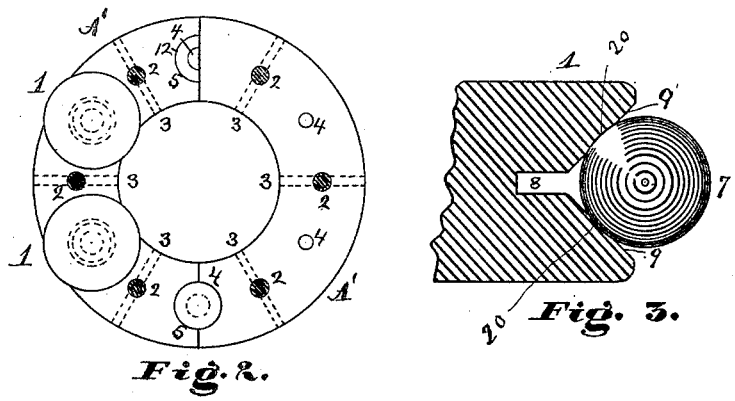

Figure 1 is a vertical section of the cage and rollers made in the median line. Fig. 2 is a sectional and end view, on a smaller scale, of the roller-bearing, showing one half as viewed from the line of section $x\ x$, the other half being the outside of the ring. Fig. 3 is a large sectional view of one end of a roller, showing the construction of the conical pits.

I construct a ring A of an annular form, and at convenient points I construct pits 10 on the inner end of said ring. In these pits 10 I put the metallic balls 7. At suitable points in the ring A, I drill holes for the accommodation of the horizontal stay-bolts 2. The horizontal stay-bolts 2 connect the rings A and A', forming a rigid cage. Horizontal stay-bolts 2 are drilled radially at convenient points corresponding with the holes drilled in the rings to accommodate the pins 3 passing through said stay-bolts 2. The rings A and A' are made to encircle the shaft running through the center of the rings. The ring A' is drilled at convenient points with holes 12. In each hole I fit a plug 6, and in the end of the said plugs 6 I construct concave pits 11 to accommodate the metallic balls 7. These plugs 6 are of the same diameter as the holes 12 and are made of sufficient length to nearly fill the said cavities or holes 12. In the holes 12 between the ends of the plugs 6 and the ring A', I place the washers 5. In the center of the holes 12 I drill through the ring A' holes 4, for the purpose of pushing out the plugs 6 or adjusting the rollers 1 to the shaft or axle. Within the cage thus formed by the rings A and A' and the horizontal bolts 2 I place a series of rollers 1. The rollers are made of metal and have a conical pit 9 in each end. In the median line of each roller at each end I drill a cylindrical hole 8, and then bore out the end of the roller with an appropriate tool, making a conical pit, the sides of which are slightly indented, as at 20, to conform to the spherical exterior of the balls 7, the said conical pits 9 not extending quite to the bottom of the hole 8.

Having thus described the parts of my invention, I now proceed to explain the method of using the same.

I secure the cage, consisting of rings A and A' and stay-bolts 2, so that the rollers 1 shall be held between the rings A and A' and roll on the balls 7. The said balls 7 act as pivots about which the rollers revolve. Before adjusting the stay-bolts 2 permanently I introduce the washers 5 into the cylindrical holes 12, and then adjust the plugs 6, carrying the balls 7 in the pits 11. I make the washers 5 of sufficient thickness to take up any slack that may exist between the balls 7 and the rollers 1 and rings A and A'. The holes 4 are drilled through the ring A' to enable the washers 5 and plugs 6 to be removed from the ring A' by introducing an appropriate instrument through the holes 4, by which they may be pushed out when the cage is detached and a thicker washer introduced, or one or more washers used in case the ends of the rollers become too much worn to properly keep the balls 7 in contact with the rollers 1.

What I claim, and desire to secure by Letters Patent, is—

1. In a roller-bearing such as herein set forth, the combination of a series of rollers, each provided with a conical pit in its opposite ends, said pits being indented to fit the peripheries of the balls seated therein, all substantially as and for the purpose set forth and described.

2. In a roller-bearing such as herein set forth, the combination of a series of rollers, each provided with a pit in its opposite ends, rings at the end of the bearing, provided with recesses, adjusting-plugs having spherical recesses therein placed in one of the rings, and balls interposed between the rollers and the rings, substantially as and for the purpose set forth and described.

3. In a roller-bearing such as herein set forth, the combination of a series of rollers, each provided with a pit in its opposite ends, rings at the ends of the bearing, having recesses therein, balls interposed between the rings and rollers, and means located in the recesses of one of the rings for adjusting the balls and rollers.

4. In a roller-bearing, the combination of a series of rollers provided with a conical recess at each end, rings at the ends of the bearings and each provided with spherical recesses corresponding in position to those of the rollers, with adjusting plugs and washers in the recesses in one of the rings, and balls supported in the recesses between the rollers and the rings, all substantially as and for the purpose set forth and described.

ERNEST WM. COOKE.

In presence of—
T. McALLISTER,
H. HAUPT, Jr.